United States Patent

[11] 3,609,000

| [72] | Inventors | Shizuo Miyano;<br>Hirotoshi Endo; Asaji Kondo; Shingo Ooue, all of Saitama, Japan |
|---|---|---|
| [21] | Appl. No. | 858,261 |
| [22] | Filed | Sept. 16, 1969 |
| [45] | Patented | Sept. 28, 1971 |
| [73] | Assignee | Fuji Photo Film Co., Ltd.<br>Nakanuma, Minami Ashigara-Machi,<br>Ashigara-Kamigun, Kanagawa, Japan |
| [32] | Priority | Sept. 16, 1968, Sept. 17, 1968 |
| [33] | | Japan |
| [31] | | 66819/68 and 67133/68 |

[54] TRANSMISSION-TYPE PROJECTION SCREEN
13 Claims, 2 Drawing Figs.

[52] U.S. Cl. ........................................................ 350/126
[51] Int. Cl. .................................................. G03b 21/60
[50] Field of Search ............................................ 350/126; 352/61, 86; 117/132 C

[56] References Cited
UNITED STATES PATENTS

| 1,966,747 | 7/1934 | Zechmanek .................. | 350/126 X |
| 2,180,113 | 11/1939 | Land .............................. | 350/126 |
| 2,271,614 | 2/1942 | Baselt ........................... | 350/126 |
| 2,906,169 | 9/1959 | Saffir ............................ | 350/126 X |
| 2,932,581 | 4/1960 | Harkness et al. ............. | 350/126 X |
| 3,279,313 | 10/1966 | Kowalik et al. .............. | 350/126 |
| 3,355,311 | 11/1967 | Gosselink ..................... | 350/126 UX |
| 3,398,018 | 8/1968 | Walters ........................ | 117/132 |

Primary Examiner—Louis R. Prince
Assistant Examiner—Joseph W. Roskos
Attorney—Sughrue, Rothwell, Mion, Zinn & Macpeak ABSTRACT: A transmission-type projection screen comprising a support having thereon a layer of a binder having microcapsules dispersed therein, said microcapsules containing particles of a material having a refractive index different from that of said binder.

The transmission-type projection screen is one wherein the refractive index of said material differs from the refractive index of said binder by a factor of at least 0.02.

PATENTED SEP 28 1971

3,609,000

INVENTORS
SHIZUO MIYANO
HIROTOSHI ENDO
ASAJI KONDO
SHINGO OOUE

3,609,000

TRANSMISSION-TYPE PROJECTION SCREEN

BACKGROUND OF THE INVENTION

FIELD OF THE INVENTION

This invention relates to a transmission-type projection screen and more particularly, it is concerned with a transmission-type projection screen having excellent diffusibility and resolving power, and which shows a reduced scintillation.

2. Description of the Prior Art

In viewing microfilms, cine-films, slide films and X-ray films, a rear projection system is generally employed in which the enlarged images of these films are projected on a screen and the reflected images are viewed as transmitted images from the opposite side of the screen to the film.

The transmission-type projection screen of the present invention is used to accomplish the above-mentioned object.

The various characteristics of a transmission-type projection screen are described in detail in Rex R. McHail, "A Study of Rear Projection Screen Materials" (Photogrammetric Engineering, No. 30, p. 949–956). According to this report, the transmission factors of light, light diffusibility, resolving power, contrast, scintillation, hot spots and color are very important. An ideal transmission-type screen is required to have a large transmission factor of light, a good light diffusibility, uniform brightness, a large resolving power, good contrast, less scintillation, less hot spots and a moderate color tone. An image projected thereon feels like a print or a photograph print and does not tax the observers' eyes for a long time.

The following two types of transmission-type projection screens are known. The first is a transmission-type screen having on a support, a binder layer containing light-diffusible particles such as an emulsion of an organic solvent solution of a polymer or fine powders; and the second is a transmission-type screen having on a support a coarse or matted surface obtained by chemically or mechanically treating the surface of the support.

However, these two screens are undesirable since, in the former, the stability of the emulsion is low and it is difficult to obtain a fine powder of uniform grain size; while in the latter, it is difficult to obtain a uniform coarseness over the whole surface.

The scintillation on the screen means the fine light and dark patterns formed due to the fine surface structure of the screen. Since these patterns are varied depending on the viewing direction of the screen, they give a scintillationlike feeling to the observers. Therefore, since a large scintillation taxes and observers' eyes when scintillation is desired.

It is an object of this invention to provide an improved transmission-type projection screen having both a high light diffusibility and a high resolving power.

Another object of the present invention is to provide an improved transmission-type projection screen showing less scintillation in addition to a high light diffusibility and a high resolving power.

SUMMARY OF THE INVENTION

The present inventors have found that the above objects of the present invention can be achieved by making uniform the grain size of the light-diffusing particles in the transmission-type projection screen.

That is, according to the present invention, there is provided a transmission-type projection screen comprising a support having thereon a layer of a binder having dispersed therein microcapsules containing a material having a different refractive index from that of the binder.

Moreover, according to another embodiment of the present invention, there is provided a transmission-type projection screen, which is particularly excellent in showing less scintillation, comprising a support having thereon a layer of a binder having dispersed therein microcapsules containing a material having a different refractive index form that of the binder and also having dispersed therein fine powders of a material having a different refractive index than that of the binder.

DETAILED DESCRIPTION OF THE PREFERRED EMBODIMENTS

Figure 1:
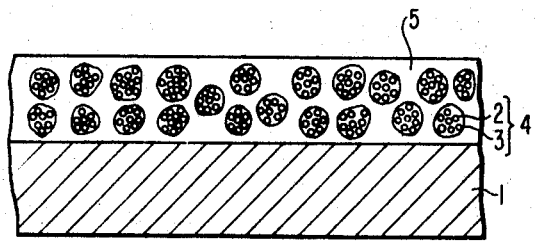
FIG. 1 is a schematic cross-sectional view showing an embodiment of the projection screen of the present invention.

FIG. 1 shows an embodiment of the transmission-type projection screen of the present invention consisting of a transparent or frost support 1 and a layer of a binder 5 having dispersed therein microcapsules 4. The microcapsules 4 comprise a shell 3 surrounding polymer particles 2 dispersed in a medium or binder.

Figure 2:
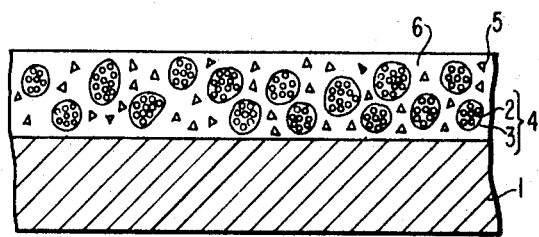
FIG. 2 is a schematic cross-sectional view showing another embodiment of this invention.

In FIG. 2 there is shown another embodiment of the present invention consisting of a support 1 and a layer 6 having dispersed therein microcapsules 4 and fine particles 5. Microcapsules 4 comprise a shell 3 surrounding polymer particles 2. The embodiment shown in FIG. 2 is particularly less scintillation.

The material to be incorporated in the microcapsules may be any material which has a refractive index different from that of the binder. In particular, it is preferable that the refractive index of this material is such that the ratio thereof to the refractive index of the binder is either more than 1.02 or less than 0.98; more preferably more than 1.04 or less than 0.96. Examples thereof are nonaqueous materials, such as polystyrene, polyvinyl chloride, polymethyl methacrylate, ethylene - vinyl acetate copolymer, etc.

Such a polymer is dissolved in a volatile organic solvent such as toluene, benzene, etc., and is supplied to a coacervation system.

In addition to the above mentioned materials, a water-insoluble high boiling solvent, such as, dibutyl phthalate (refractive index 1.49), tributyl phosphate (refractive index 1.42), octyl alcohol or diphenyl chloride may be incorporated in the microcapsules.

The preparation of the microcapsules is not particularly limited, and the coacervation method disclosed in U.S. Pat. No. 2,800,457 provides an excellent manner of obtaining fine and uniform size microcapsules. As the colloid used for forming the shell or wall of the microcapsules, there may be illustrated: polycations, such as water-soluble proteins such as gelatin and casein, and polyanions, such as water-soluble polymers having acid groups in the molecule, such as gum arabic, dextran sulfate, polyvinylsulfonic acid and maleic anhydride copolymers.

The amount of material to be incorporated in the microcapsules is preferably 0.1 to 10 times by weight, particularly, 2 to 4 times by weight, that of the colloid used to form the film of the coacervate.

As the binder for the microcapsules, the following may be used: gelatin, polyvinyl alcohol, sodium alginate or cellulose derivatives. The amount of binder employed is such as to adequately disperse the microcapsules, and is preferably from one-fifth to 5 times, by weight, the amount of the microcapsules. The binder may be insolubilized, after coating, with a hardening agent. In the case of using gelation as the binder, for example, polystyrene having a refractive index of 1.59 is preferred as the material to be incorporated in the microcapsules, since gelatin has a refractive index of 1.53.

The microcapsule and binder may be colored with a dye or pigment so as to improve the quality and feeling.

In accordance with the transmission-type projection screen of the present invention, the uniform particle size microcapsules comprising a material having a refractive index different from that of the binder act as an element for diffusing the light, thereby providing a large light diffusibility and a high resolving power. In order to obtain a projection screen which has an excellent light diffusibility, it is known that the particle diameter of the light-diffusible particles should be 1 to 10 microns, preferably 2 to 6 microns if the difference in refractive index between the light-diffusible particles and the binder (refractive index 1.5) is about 0.1 to 0.2. However, these conventional light-diffusible particles are prepared by an emulsifying method or by a grinding method and it is comparatively difficult to make fine particles having a uniform particle size. On the other hand, in the present invention, the light-diffusing particles are prepared by a capsulating method, which is an important feature of this invention. Light-diffusing particles having a particle size in the aforesaid range and also having very uniform particle size can be readily prepared.

In other words, in the present invention, when microcapsules are employed as the light-diffusible particles, the deviation in particle sizes (as the value of the standard deviation of size distribution divided by the average size) can be readily reduced to below 0.2, which is very difficult to achieve by employing either conventional emulsifying methods or a method of dispersing fine particles.

In table 1 there are compared the characteristics of the projection screen of the present invention wit commercially available screens. As is evident from this table, the screen of the present invention has an excellent diffusibility and resolving power due to the use of uniform size microcapsules.

TABLE 1

| | Comparison of Characteristics of Screens | |
|---|---|---|
| | Diffusibility ($\theta_{0.5}$) | Resolving power (lines/mm.) |
| Commercially available screen A | 17° | 14 |
| Commercially available screen B | 15° | 13 |
| Commercially available screen C | 6° | 8 |
| Commercially available screen D | 19° | 11 |
| Screen of the present invention | 23° | 15 |

When a screen is struck vertically with a parallel bean of light, the transmitted light diffuses in various directions. The diffusibility in table 1 shows the extent of this diffusion. In other words, the distribution of the light beam diffusing from the incident point of the screen is measured in a plane including the incident light beam and the central line of the vertically transmitted light beam and the central line of the vertically transmitted light beam by means of a Goniophotometer, and the angle of direction is designated as $\theta_{0.5}$ at which the intensity of the diffused light is one-half of the intensity of the vertically transmitted light. Therefore, the larger the value of $\theta_{0.5}$, the better the diffusibility of the screen. In a completely diffusing surface, $\theta_{0.5}$ is 60°. The $\theta_{0.5}$ value of the screen of the present invention is 23°, which is larger than those of known screens.

Measurement of the resolving power is carried out by throwing a resolving power chart of parallel lines on the screen, wherein the line width the line interval are the same (Foucault chart), and viewing the image from both the throwing side and the opposite side by the use of a microscope. The resolving power is represented by the number of lines per 1 mm. of the narrowest chart to be decomposed and distinguished on the screen. The larger this value, the sharper an image on the screen. The resolving power of our screen is excellent as shown by the value 15 lines/mm. in table 1.

In another embodiment of the present invention, as shown in FIG. 2, fine particles of a material having a refractive index different from that of the binder are uniformly dispersed in the binder together with the aforesaid microcapsules to effectively reduce the scintillation of the screen.

The material employed for the fine particles may be one having a refractive index different from that of the binder, but a material having a ratio of refractive index of the material to that of the binder of higher than 1.02 or lower than 0.98 is preferably used. Preferable examples of the material are silica, calcium carbonate, barium sulfate, starch, etc. Further, the preferable particle size is less than 50 microns, more preferably 2–6 microns.

As mentioned above, the aforesaid transmission-type projection screen gives less scintillation due to the presence of the microcapsules and the fine particles dispersed in the binder, and also has a high light diffusibility since the microcapsules contain particles of a polymer having a refractive index different from that of the binder.

The results of comparison tests between the properties of the above-mentioned embodiment of the present invention and commercially available transmission-type projection screens are shown in the following table:

TABLE 2

| | Scintillation | Diffusibility ($\theta_{0.5}$) | Resolving power (line/mm.) |
|---|---|---|---|
| Commercial Article A | 9 | 17° | 14 |
| Commercial Article B | 15 | 15° | 13 |
| Invention Screen | 17 | 23° | 15 |

In table 2, the scintillation was evaluated by six observers, the screen given the least scintillation was evaluated to be 3, a middle scintillation to be 2, and severe scintillation to be 1. Thus, the larger the number the less the scintillation. The values shown in table 2 are the sums of the evaluations of the six observers.

The diffusibility and the resolving power have the same meanings as in table 1.

The transmission-type projection screen of this invention is generally prepared as follows. A solution of a synthetic polymer in an organic solvent is emulsified in a colloidal aqueous solution of a polycation such as gelatin, and the solution is then mixed with an aqueous solution of a polyanion such as gum arabic, to form microcapsules having a particle size of less than 50 microns, preferably 1–10 microns (Coacervation method). Since the organic solvent in the capsules volatilizes during the encapsulation, the formed microcapsule comprises only the polymer particles. The thus-formed microcapsules are dispersed in an aqueous solution of a binder together with, if necessary, the aforesaid fine powders and the dispersion is applied to a transparent or frosted support in a thickness of from 10 to 100 microns and dried.

The following examples are given in order to further illustrate the present invention in detail.

EXAMPLE 1

Thirty g. of the 50 percent toluene solution of polystyrene was emulsified in 60 g. of a 5 percent aqueous solution of gelatin to a size of less than 1 micron. The emulsion was mixed with 300 ml. of a 1 percent aqueous solution of gum arabic and with 13 ml. of a 2.5 percent aqueous solution of acetic acid while stirring and heating at 45° C. The coacervate is deposited around the polystyrene particles to form microcapsules of about 7 microns. The system was cooled to lower than 10° C., 2 ml. of 10 percent aqueous solution of chrome alum was added thereto and, after 30 minutes, 14 ml. of a 2 percent aqueous solution of sodium carbonate was added to adjust the pH to 6.0. Microcapsules comprising fine particles of polystyrene contained in a hardened film were given. Eighty-two g. of a slurry was obtained by centrifugal separation. One hundred g. of 10 percent gelatin and 18 g. of water were added to 200 g. of a capsule liquid. The capsule liquid was applied to a glass sheet in a proportion of 5 ml. per 100 cm², and dried to give a screen glass having a film thickness of about 50 microns as shown in FIG. 1.

EXAMPLE 2

A procedure similar to that of example 1 was repeated except that the polystyrene solution was colored with 0.2 g. of phthalocyanine and 0.1 g. of phthalocyanine blue.

The results of table 1 are those obtained by utilizing the screen obtained by the above procedure.

EXAMPLE 3

A procedure similar to that of example 2 was repeated except that 5 g. of calcium carbonate particles of about 5 microns in particle size and 30 g. of an aqueous 20 percent gelatin, per 150 g. of liquid, were added to the capsule-containing liquid to provide a screen glass as shown in FIG. 2. The results of table 2 are those obtained by utilizing this screen.

EXAMPLE 4

A procedure similar to that of example 1 was repeated except that 20g. of a 20 percent toluene solution of polybutyl acrylate was used in place of the polystyrene solution, and a mixture of phthalocyanine black and phthalocyanine blue was added to the gelatin binder.

EXAMPLE 5

A procedure similar to that of example 1 was repeated except that 4 g. of dibutyl phthalate was used in place of 30 g. of the 50 percent toluene solution of polystyrene. EXAMPLE 6

A procedure similar to that of example 1 was repeated except that 3 g. of diphenyl chloride (degree of chlorination 4) was used in place of the 50 percent toluene solution of polystyrene.

EXAMPLE 7

A procedure similar to that of example 3 was repeated while using 10 g. of silica gel powders having a grain size of about 5 microns instead of the calcium carbonate.

EXAMPLE 8

A procedure similar to that of example 3 was repeated while using a mixture of 4g. of calcium carbonate particles and 1 g. of silica powders instead of the calcium carbonate above.

In the above examples, a glass plate was used as the support, but plastic films, such such as polyethylene terephthalate films, triacetyl cellulose films, polycarbonate films, etc., can, of course, be employed.

What is claimed is:

1. A transmission-type projection screen comprising a support having thereon a layer of a binder having microcapsules dispersed therein, said microcapsules containing particles of a material having a refractive index different from that of said binder, said layer having a thickness of from 10 to 100 microns and the refractive index of said material differing from the refractive index of said binder by a factor of at least 0.02.

2. The transmission-type projection screen as in claim 1, wherein said binder is selected from the group consisting of gelatin, polyvinyl alcohol, sodium alginate and cellulose derivatives.

3. The transmission-type projection screen as in claim 1, wherein said material contained in said microcapsules is selected from the group consisting of polystyrene, polyvinyl chloride, polymethyl methacrylate and an ethylene-vinyl acetate copolymer.

4. The transmission-type projection screen as in claim 1, wherein the amount of binder is from one-fifth to 5 times, by weight, the amount of said microscapsules.

5. The transmission-type projection screen as in claim 1, wherein the amount of said material in said microcapsule is from 0.1 to 10 times, by weight, the amount of the colloid material used to form the film of said microcapsule surrounding said material.

6. The transmission-type projection screen as in claim 1, wherein the particle size of said microcapsules is less than 50 microns.

7. The transmission-type projection screen as in claim 6, wherein the particle size of said microcapsules is from 1 to 10 microns.

8. The transmission-type projection screen as in claim 1, wherein the amount of said material in said microcapsule is from 2 to 4 times, by weight, the amount of the colloid material used to form the film of said microcapsule surrounding said material.

9. The transmission-type projection screen as in claim 1, wherein the particle size of said microcapsules is from 2 to 6 microns.

10. A transmission-type projection screen comprising a support having thereon a layer of a binder having microcapsules and fine particles of a first material having a refractive index different from that of said binder dispersed therein, said microcapsules containing particles of a second material having a refractive index different from that of said binder, said layer having a thickness of from 10 to 100 microns and the refractive index of said material differing from the refractive index of said binder by a factor of at least 0.02.

11. The transmission-type projection screen as in claim 10, wherein said binder is selected from the group consisting of gelatin, polyvinyl alcohol, sodium alginate and cellulose derivatives.

12. The transmission-type projection screen as in claim 10, wherein said first material to be dispersed in said binder is selected from the group consisting of silica, calcium carbonate, barium sulfate and starch.

13. The transmission-type projection screen as in claim 10, wherein said second material contained in said microcapsules is selected from the group consisting of polystyrene, polyvinyl chloride, polymethyl methacrylate and an ethylene-vinyl acetate copolymer.